(12) United States Patent
Ogasawara et al.

(10) Patent No.: US 8,378,928 B2
(45) Date of Patent: Feb. 19, 2013

(54) DISPLAY PANEL AND DISPLAY APPARATUS

(75) Inventors: Isao Ogasawara, Osaka (JP); Toshiaki Fujihara, Osaka (JP); Takaharu Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 83 days.

(21) Appl. No.: 12/682,783

(22) PCT Filed: Jun. 16, 2008

(86) PCT No.: PCT/JP2008/060979
§ 371 (c)(1),
(2), (4) Date: Apr. 13, 2010

(87) PCT Pub. No.: WO2009/057342
PCT Pub. Date: May 7, 2009

(65) Prior Publication Data
US 2010/0214195 A1    Aug. 26, 2010

(30) Foreign Application Priority Data

Oct. 31, 2007   (JP) .................................. 2007-283938

(51) Int. Cl.
*G09G 3/20*    (2006.01)

(52) U.S. Cl. ........................... 345/55; 345/695; 345/698

(58) Field of Classification Search .................... 345/55, 345/80, 204, 87–102, 690, 695, 698; 349/143, 349/149
See application file for complete search history.

(56) References Cited

U.S. PATENT DOCUMENTS

| 7,859,525 | B2 * | 12/2010 | Takatori et al. ............... 345/206 |
| 2006/0077191 | A1 * | 4/2006 | Ming-Daw et al. ........... 345/204 |
| 2006/0146211 | A1 * | 7/2006 | Deane et al. .................... 349/42 |
| 2008/0012794 | A1 * | 1/2008 | Battersby ....................... 345/55 |
| 2008/0018557 | A1 * | 1/2008 | Maeda ............................ 345/55 |
| 2008/0048934 | A1 * | 2/2008 | Yamamoto et al. ............ 345/55 |
| 2008/0088568 | A1 * | 4/2008 | Haga et al. .................... 345/100 |

FOREIGN PATENT DOCUMENTS

| JP | 2005-315960 A | 11/2005 |
| JP | 2006-276580 A | 10/2006 |

OTHER PUBLICATIONS

Official Communication issued in International Patent Application No. PCT/JP2008/060979, mailed on Sep. 2, 2008.

* cited by examiner

*Primary Examiner* — Hong Zhou
(74) *Attorney, Agent, or Firm* — Keating & Bennett, LLP

(57) ABSTRACT

The present invention provides an irregularly-shaped display panel having a display region with a contour section having a good appearance, which is easily designed and produced. The present invention is a display panel comprising a display region including: an array of a plurality of pixels each constituted by a plurality of sub-pixels; and a plurality of wirings provided along boundaries of the plurality of sub-pixels, wherein a plurality of pixels include a pixel for a contour located in a contour section of the display region; the sub-pixels constituting the pixel for a contour have aperture regions having similar aperture areas to one another and contour lines each running in parallel with a drawing direction of one of the wirings at least on the side of a frame region; and the aperture area of the pixel for a contour is smaller than an aperture area of a pixel located at an inner side of the contour section of the display region.

6 Claims, 18 Drawing Sheets

DISPLAY PANEL AND DISPLAY APPARATUS

BACKGROUND OF THE INVENTION

1. Field of the Invention

The present invention relates to a display panel and a display device. More specifically, the present invention relates to a display panel and a display device, suitably used in an irregularly-shaped display panel such as an in-car instrumental panel, a car navigation system, a display device for amusement equipment.

2. Description of the Related Art

A display device provided with a thinner display panel has been widely spread as a display device used in a TV, a personal computer, and a mobile phone. A liquid crystal display panel, a plasma display panel (hereinafter, also referred to as a "PDP") and the like may be mentioned as a display panel in current practical use. Further, a panel for an organic electroluminescence device (hereinafter, also referred to as an "organic EL display") may be mentioned as a display panel actively studied with an aim of the future diffusion thereof.

Although various displays are provided as thus described, shapes of the display regions are almost in common. Namely, the display panel generally has a substantially-rectangular or substantially-square display region. However, there are increasing expectations for irregularly-shaped display panels with display regions having various planer shapes other than the substantially-rectangular and substantially-square shapes, such as a curved contour and an oblique contour, with an aim of improving the design. Such an irregularly-shaped display panel is to be used as a display panel in an in-car instrumental panel, a display device for amusement equipment, or the like.

There is little disclosure of the art relating to such an irregularly-shaped panel. However, a liquid crystal display is disclosed, on which a liquid crystal panel having an elliptical or circular display area (display region) which has satisfactory color balance and is easily viewable is provided (see Japanese Kokai Publication No. 2006-276580). The liquid crystal display is provided with: a liquid crystal panel, in which a liquid crystal layer is formed between a first substrate and a second substrate; and a housing for housing the liquid crystal panel. The first substrate is provided with a color filter layer and an opposed electrode. The second substrate is provided with a plurality of pixel electrodes. The housing has an aperture for exposing the display area of the liquid crystal panel. The display region of the liquid crystal panel is substantially formed in an elliptical or circular shape, and the color filter layer formed on the first substrate is formed in substantially the same shape as that of the display area.

In the liquid crystal display device disclosed in Japanese Kokai Publication No. 2006-276580, the pixel on the boundary has an elliptical or circular aperture shape, and therefore, it is not easy at all to design and produce such a device. Namely, it is very hard to achieve such a configuration. If the aperture ratio of the pixel on the boundary is significantly adjusted in the configuration illustrated in FIG. 6 of Japanese Kokai Publication No. 2006-276580, namely, if the aperture ratio thereof is greatly different especially from the aperture ratio of a main pixel, the appearance of the display region may be deteriorated. In addition, each pixel located on the boundary between the display region and the frame region does not always include all of the sub-pixels to be included in a pixel, and therefore, it is hard to adjust the aperture ratio of each pixel on the boundary. Further, in the configurations illustrated in FIGS. 6 and 8 of Japanese Kokai Publication No. 2006-276580, the boundary of the display region tends to be rough especially in the case of a monochrome display, and the appearance of the display is deteriorated.

SUMMARY OF THE INVENTION

The present invention has been made in view of the above-mentioned state of the art. The present invention has an object to provide an irregularly-shaped display panel which has a display region with a contour section having a good appearance and is easily designed and produced, and a display device.

The present inventors made various investigations on an irregularly-shaped display panel having a display region with a contour section having a good appearance, which is easily designed and produced. The inventors noted pixels constituting the contour section of the display region. Then, the inventors found the following. A Preferred embodiment may be employed, wherein a plurality of pixels located in a contour section of a display region include a pixel lacking at least one sub-pixel on a side of a frame region, and the contour section of the display region is defined by a plurality of the sub-pixels arranged stepwise by single sub-pixel units. Another Preferred embodiment may be employed, wherein a contour section of a display region is defined by a plurality of pixels arranged stepwise by single pixel units. Still another Preferred embodiment may be employed, wherein a plurality of pixels include pixels for a contour located in a contour section of a display region; sub-pixels constituting the pixel for a contour have aperture regions having similar aperture areas to one another and contour lines each running in parallel with a drawing direction of one of wirings at least on a side of a frame region; and the aperture area of the pixel for a contour is smaller than an aperture area of a pixel located at an inner side of the contour section of the display region. Further, the above Preferred embodiments may be employed in combination. An irregularly-shaped display panel with a contour section having a good appearance is easily designed and produced. As a result, the above-mentioned problems have been admirably solved, leading to completion of the present invention.

Namely, the present invention is a display panel comprising: a display region including an array of a plurality of pixels each constituted by a sub-pixel; and a frame region provided around the display region, wherein a plurality of pixels located in a contour section of the display region include a pixel lacking at least one sub-pixel on a side of the frame region, and the contour section of the display region is defined by a plurality of the sub-pixels arranged stepwise by single sub-pixel units (hereinafter, also referred to as a "first display panel of the present invention"). As a result, an irregularly-shaped display panel with a contour section having a good appearance is easily designed and produced.

The first display panel of the present invention may or may not include other components as long as it essentially includes such components. The configuration of the display panel of the present invention is not especially limited.

The present invention is a display panel comprising a display region including an array of a plurality of pixels each constituted by a plurality of sub-pixels, wherein a contour section of the display region is defined by a plurality of pixels arranged stepwise by single pixel units (hereinafter, also referred to as a "second display panel of the present invention"). As a result, an irregularly-shaped display panel with a contour section having a good appearance is easily designed and produced.

The second display panel of the present invention may or may not include other components as long as it essentially includes such components. The configuration of the display panel of the present invention is not especially limited.

The present invention is a display panel comprising a display region including: an array of a plurality of pixels each constituted by a plurality of sub-pixels; and a plurality of wirings provided along boundaries of the plurality of sub-pixels, wherein the plurality of pixels include a pixel for a contour located in a contour section of the display region; the sub-pixels constituting the pixel for a contour have aperture regions having similar aperture areas to one another and contour lines each running in parallel with a drawing direction of one of the wirings at least on a side of a frame region; and the aperture area of the pixel for a contour is smaller than an aperture area of a pixel located at an inner side of the contour section of the display region (hereinafter, also referred to as a "third display panel of the present invention").

In the third display panel of the present invention, the aperture area of the pixel for a contour is smaller than the aperture area of a pixel located at an inner side of the contour section of the display region. Accordingly, use of the pixel for a contour and normal sized pixels located at the inner side of the contour section of the display region allows the third display panel of the present invention to have the display region with a nearly-curved or nearly-oblique contour. As a result, an irregularly-shaped display panel with a contour section having a good appearance is easily designed and produced.

In the third display panel of the present invention, the sub-pixels constituting the pixel for a contour have similar aperture areas to one another. Accordingly, the sub-pixels constituting the pixel for a contour and the sub-pixels constituting the normal pixels located at the inner side of the contour section of the display region can be set to have substantially the same aperture area ratios. As a result, coloring can be prevented in the pixel for a contour.

Further, the sub-pixels constituting the pixel for a contour are set to have aperture regions each having the contour lines running in parallel with the drawing direction of one of the wirings at least on the side of the frame region. As a result, the third display panel of the present invention is easily designed and produced.

It is to be noted that the aperture area refers to the area of the aperture region, and it may be the area of a region that emits light (an emissive region).

In the present description, the "similar" area is not especially limited as long as it is within the range in which each effect of the present invention can be exerted. It may be completely the same area or substantially the same area.

Further, in the present invention, the degree of parallelism indicated by "parallel" is not especially limited as long as the degree parallel enough to exert each effect of the present invention is kept. It may be completely parallel or substantially parallel.

The third display panel of the present invention may or may not include other components as long as it essentially includes such components. The configuration of the third display panel of the present invention is not especially limited.

Preferred embodiments of the first, second, and third display panels of the present invention are mentioned in more detail below. It is to be noted that various Preferred embodiment mentioned below may be employed in combination.

In the first, second, and third display panels of the present invention, not less than three colors of sub-pixels are preferably provided as the plurality of sub-pixels from the standpoint of conducting color display excellent in color reproducibility.

In the third display panel of the present invention, sub-pixels constituting the pixel for a contour preferably have similar aperture shapes to one another from the standpoint of more facilitating the design and production of an irregularly-shaped display panel.

On the other hand, in the third display panel of the present invention, the sub-pixels constituting the pixel for a contour preferably have different aperture shapes from one another from the standpoint of more improving the appearance of the contour section of the display region in the irregularly-shaped display panel.

Further, from the standpoint of more improving the appearance of the contour section of the display region in the irregularly-shaped display panel, the plurality of pixels preferably include a plurality of pixels for a contour located in the contour section of the display region in the third display panel of the present invention. Further, the sub-pixels constituting the plurality of pixels for a contour preferably have similar aperture areas in respective pixels for a contour and contour lines each running in parallel with a drawing direction of one of the wirings at least on a side of a frame region. Furthermore, aperture areas of the plurality of the pixels for a contour vary stepwise along the contour of the display region.

It is to be noted that the aperture shape refers to the shape of the aperture region, and namely, it may be the shape of a region that can emit light (an emissive region).

From the standpoint of easily defining the aperture area of each of the sub-pixels constituting the plurality of pixels for a contour, the below Preferred embodiments are preferred. Namely, in the third display panel of the present invention, the third display panel comprises a light-shielding member and the light-shielding member defines the aperture area of each of the sub-pixels constituting the pixel for a contour. Further, the display panel comprises a substrate and a pixel electrode provided on the substrate, and the pixel electrode defines the aperture area of each of the sub-pixels constituting the pixel for a contour.

From the same standpoint, the below Preferred embodiments are preferred. Namely, in the third display panel of the present invention, the third display panel comprises a light-shielding member and the light-shielding member defines the aperture shape of each of the sub-pixels constituting the pixel for a contour. Further, the display panel comprises a substrate and a pixel electrode provided on the substrate, and the pixel electrode may define the aperture shape of each of the sub-pixels constituting the pixel for a contour.

It is to be noted that the material or shape of the pixel electrode is not especially limited as long as it is an electrode placed at least in the region that can emit light.

A wiring layer and a black matrix are preferably used as the light-shielding member. Namely, in the third display panel of the present invention, the display panel may comprise a substrate, and the light-shielding member may be a black matrix provided on the substrate. Further, the display panel may comprise a substrate and a wiring provided on the substrate, and the light-shielding member may comprise the same layer as the wiring. It is to be noted that both the wiring layer and the black matrix may be used in combination as the light-shielding members. Accordingly, the light-shielding member may include a black matrix provided on the substrate, or alternatively, the light-shielding member may include a black matrix provided on the substrate and the layer of the wiring provided on the substrate.

The present invention is also a display device provided with the first, second, or third display panel of the present invention. Accordingly, it is possible to produce a display device having an irregularly-shaped display region with a contour section having a good appearance, which is easily designed and produced.

According to the display panel and the display device of the present invention, it is possible to produce an irregularly-shaped display panel having a display region with a contour section having a good appearance, which is easily designed and produced.

The present invention is mentioned in more detail below with reference to Preferred embodiments using drawings, but not limited to only these Preferred embodiments. It is to be noted that the display panel of the present invention is not especially limited as long as it is a display panel with a display region comprising pixels arranged in a matrix. Examples thereof include a liquid crystal display panel, a PDP, and an organic EL display panel. Among these, a liquid crystal display panel and an organic EL display panel are preferable from the standpoint of enabling reduction in thickness, less power consumption, and weight reduction.

DETAILED DESCRIPTION OF THE PREFERRED EMBODIMENTS

Preferred Embodiment 1

Figure 1:
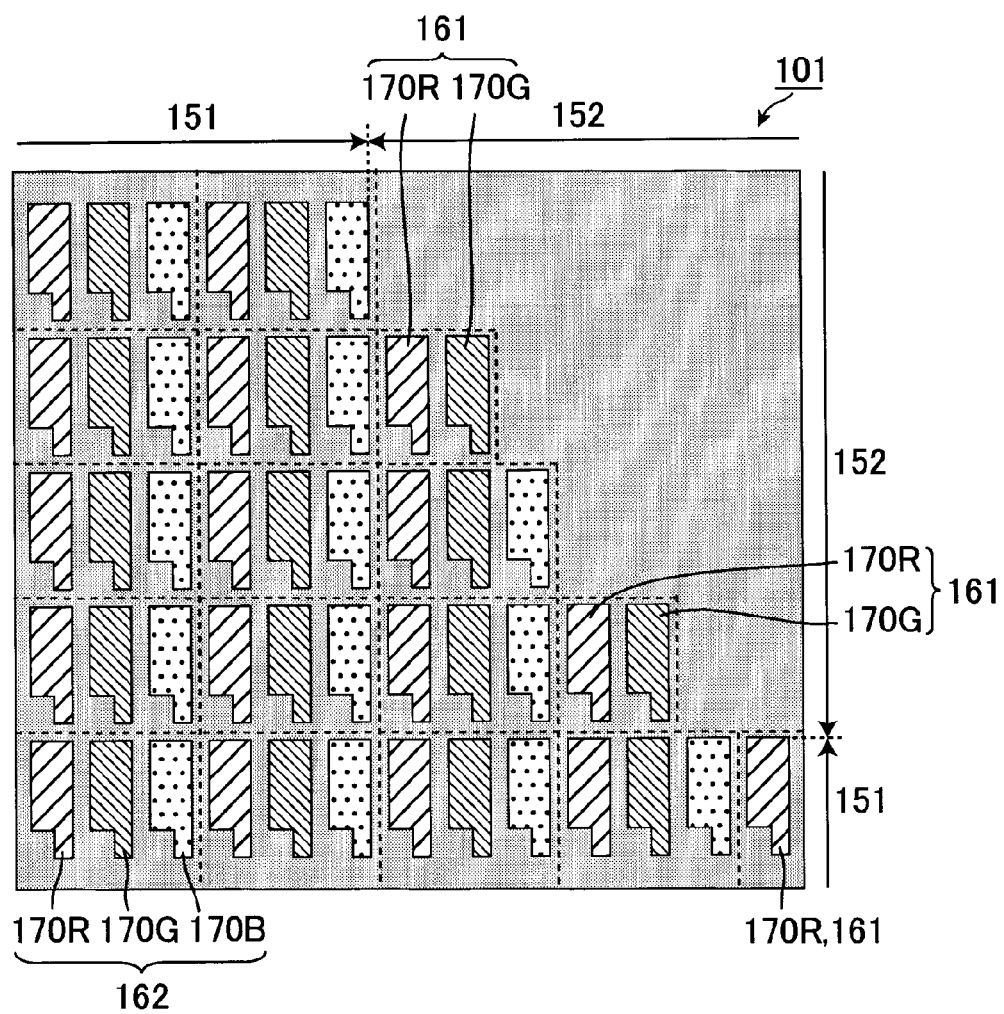
FIG. 1 is a schematic plan view showing pixels in the vicinity of the contour section of the display region in the display panel of Preferred embodiment 1.
Figure 2:
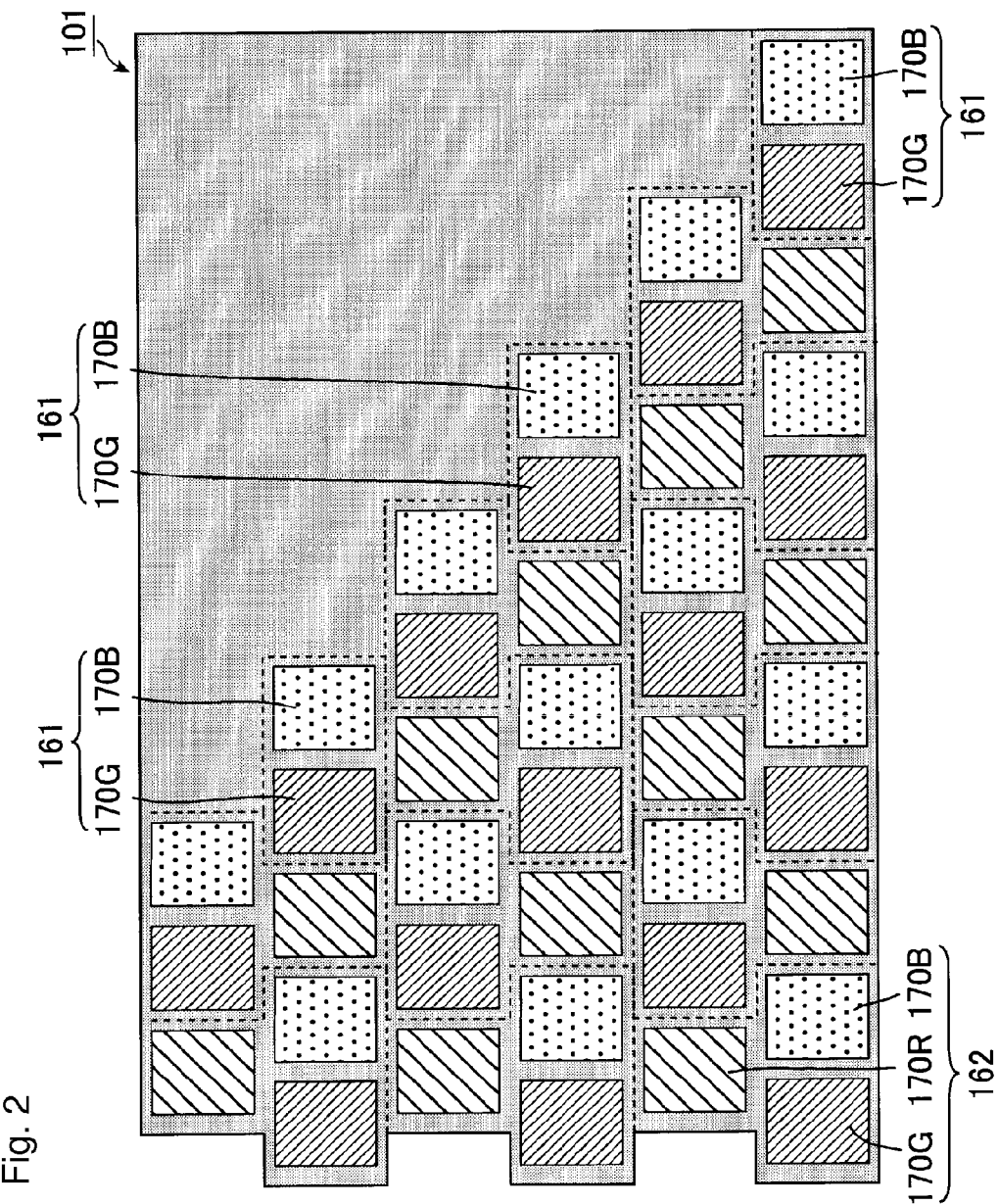
FIG. 2 is a schematic plan view showing a variation of the display panel of Preferred embodiment 1.

Preferred embodiment 1 of the present invention is mentioned with reference to FIGS. 1 and 2. FIG. 1 is a schematic plan view showing pixels in the vicinity of the frame section of the display region in the display panel of Preferred embodiment 1. FIG. 2 is a schematic plan view showing a variant example of the display panel of Preferred embodiment 1. It is to be noted that each of the regions defined by dotted lines in FIGS. 1 and 2 indicates a single pixel.

A display panel 101 of the present Preferred embodiment comprises, as shown in FIG. 1, a display region (display area) 151 in which a plurality of pixels are arranged in a matrix array, and a frame region (non-display area) 152 as a light-shielding region which displays nothing and is located around the display region 151. Each pixel is provided in the inner region of the display region 151 and includes a plurality of inner pixels 162 each constituted by a red (R) sub-pixel 170R, a green (G) sub-pixel 170G, and a blue (B) sub-pixel 170B arranged in stripes. The inner pixels 162 constitute the majority of the display region 151 and mainly conduct image display. As thus described, the pixel array of the display panel 101 is a stripe array. The pixels further include a plurality of pixels 161 for a contour provided in the contour section of the display region 151. In each pixel 161 for a contour, at least one of the red (R) sub-pixel 170R, the green (G) sub-pixel 170G, and the blue (B) sub-pixel 170B arranged in stripes is deleted on the side of the frame region 152. Namely, in the pixel 161 for a contour, sub-pixels lacking at least one pixel (one or two selected from the sub-pixels 170R, 170G, and 170B) compared to the inner pixel 162 comprising sub pixels 170R, 170G, and 170B are arranged in stripes from the side of the display area 151. The sub pixels 170R, 170G, and 170B are arranged stepwise (stepped-shape formed by combining L-shapes and/or inverted L-shapes) by single sub-pixel units with use of the pixels 161 for a contour and the inner pixels 163 to form the contour section of the display region 151. It is to be noted that the boundary regions of respective sub-pixels 170R, 170G, and 170B constituting the inner pixels 162 and the pixels 161 for a contour are shielded by light-shielding members so as to prevent color mixing that leads to reduction in contrast.

According to the display panel 101 of the present Preferred embodiment, sub-pixels 170R, 170G, and 170B are arranged stepwise comparatively smoothly by single sub-pixel units in the contour section of the display region 151, and thereby the display area 151 is allowed to have the contour section having a comparatively good appearance.

Further, change in the number of the sub-pixels can easily set and form the pixel 161 for a contour; thereby the display panel 101 of the present Preferred embodiment can be easily designed and produced.

The pixel array in the display panel 101 of the present Preferred embodiment is not specifically limited to the stripe array as long as it is a common pixel array. It may also be a delta array, a mosaic array, or the like. More specifically, in the display panel 101, as shown in FIG. 2, the inner pixel 162 may be constituted by the sub-pixels 170R, 170G, and 170B arranged in the delta array. Further, the pixel 161 for a contour may lack at least one of the sub-pixels 170R, 170G, and 170B arranged in the delta array on the side of the frame region 152. In this manner, the same effect as in the case of the stripe array can be exerted.

Preferred Embodiment 2

Figure 3:
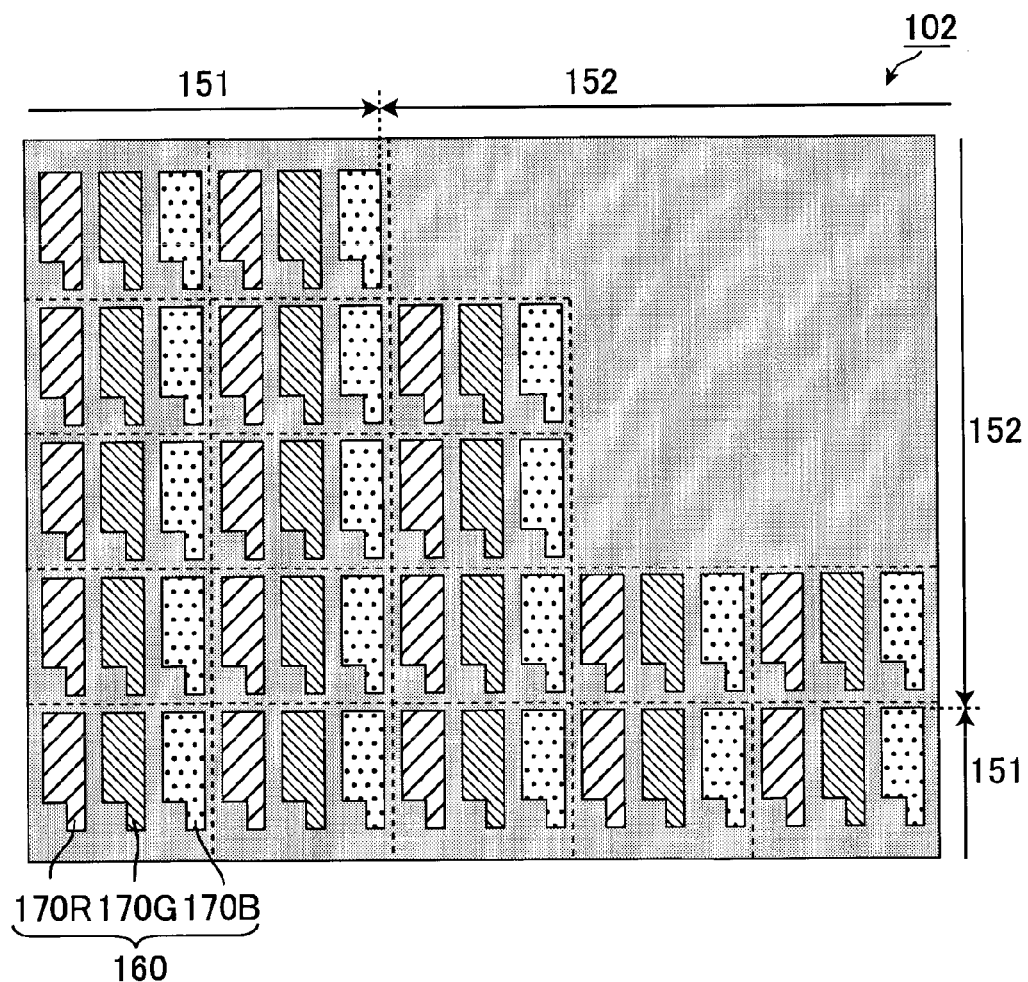
FIG. 3 is a schematic plan view showing pixels in the vicinity of the contour section of the display region in the display panel of Preferred embodiment 2.
Figure 4:
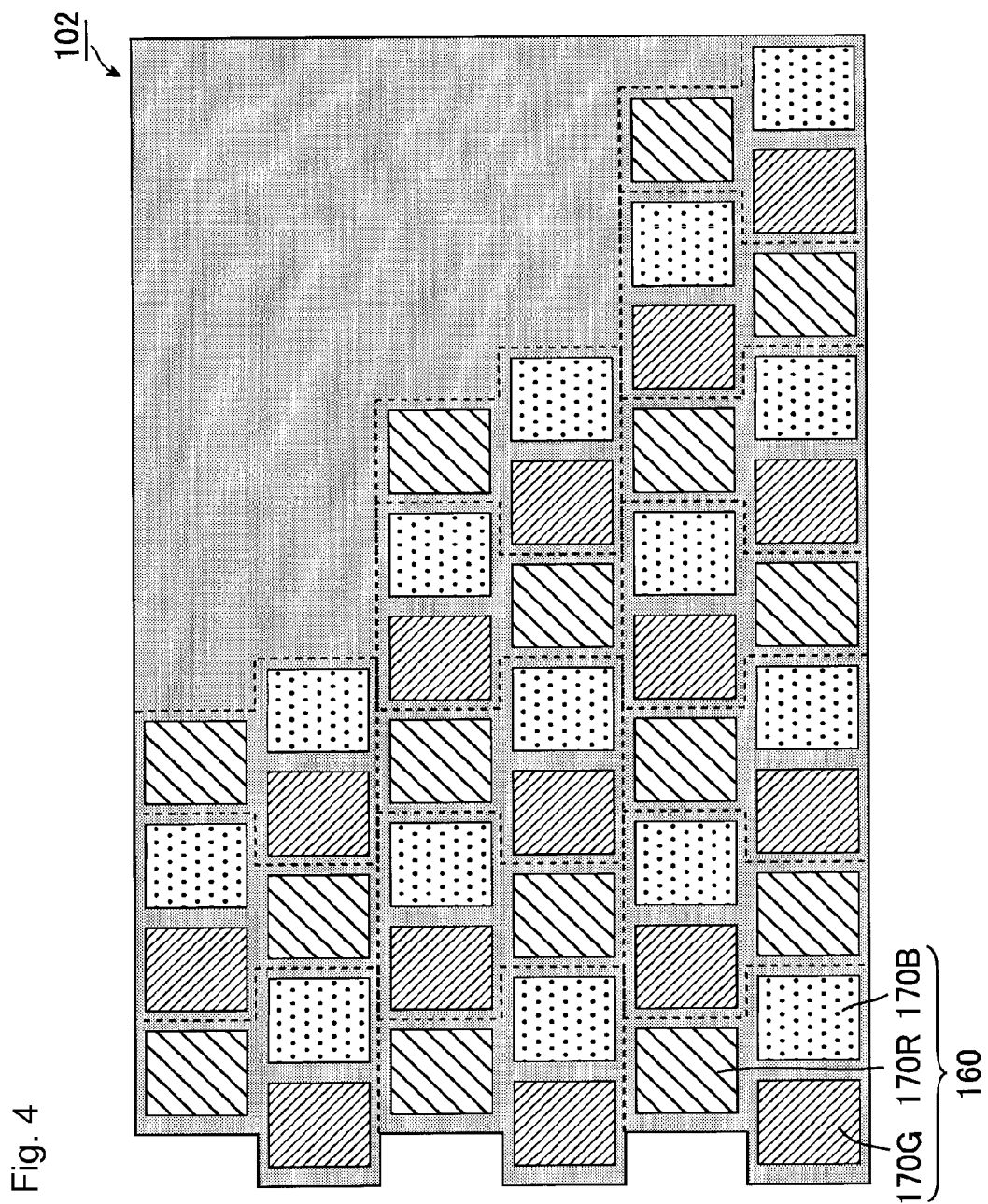
FIG. 4 is a schematic plan view showing a variation of the display panel of Preferred embodiment 2.

Preferred embodiment 2 of the present invention is mentioned with reference to FIGS. 3 and 4. FIG. 3 is a schematic plan view showing pixels in the vicinity of the contour section of the display region in the display panel of Preferred embodiment 2. FIG. 4 is a schematic plan view showing a variation of the display panel of Preferred embodiment 2. It is to be noted that, in the present Preferred embodiment, the same number is assigned to the member having the same function as in Preferred embodiment 1. Further, it is to be noted that the regions defined by dotted lines in FIGS. 3 and 4 each indicates a single pixel.

A display panel 102 of the present Preferred embodiment comprises, as shown in FIG. 3, a display region (display area) 151 in which a plurality of pixels 160 are arranged in a matrix array, and a frame region (non-display area) 152 as a light-shielding region which displays nothing and is located around the display region 151. Each pixel 160 is constituted by a red (R) sub-pixel 170R, a green (G) sub-pixel 170G, and a blue (B) sub-pixel 170B arranged in stripes. As thus described, the pixel array of the display panel 102 is a stripe array. It is to be noted that the boundary regions of respective sub-pixels 170R, 170G, and 170B constituting each pixel 160 are shielded by light-shielding members so as to prevent color mixing that leads to reduction in contrast. The pixels 160 are arranged stepwise by single pixel units to form the contour section of the display region 151.

According to the display panel 102 of the present Preferred embodiment, pixels 160 are arranged stepwise (stepped-shape formed by combining L-shapes and/or inverted L-shapes) by single pixel units in the contour section of the display region 151, and thereby the display area 151 is allowed to have a contour section having a comparatively good appearance.

Further, change in the arrangement of the pixels 160 can easily design and form the contour section of the display region 151; thereby, the display panel 102 of the present Preferred embodiment can be easily designed and produced.

In addition, each pixel 160 located in the contour section of the display region 151 is constituted by the sub-pixels 170R, 170G, and 170B, and therefore, coloring in the contour section of the display region 151 can be prevented.

The pixel array in the display panel 102 of the present Preferred embodiment is not specifically limited to a stripe array as long as it is a common pixel array. It may also be a delta array, a mosaic array, or the like. More specifically, in the display panel 102, as shown in FIG. 4, the pixel 160 may be constituted by the sub-pixels 170R, 170G, and 170B arranged in the delta array. Further, the pixel 160 may be arranged stepwise by single pixel units to form the contour section of the display region 151. In this manner, the same effect as in the case of the stripe array can be exerted.

Preferred Embodiment 3

Figure 5:
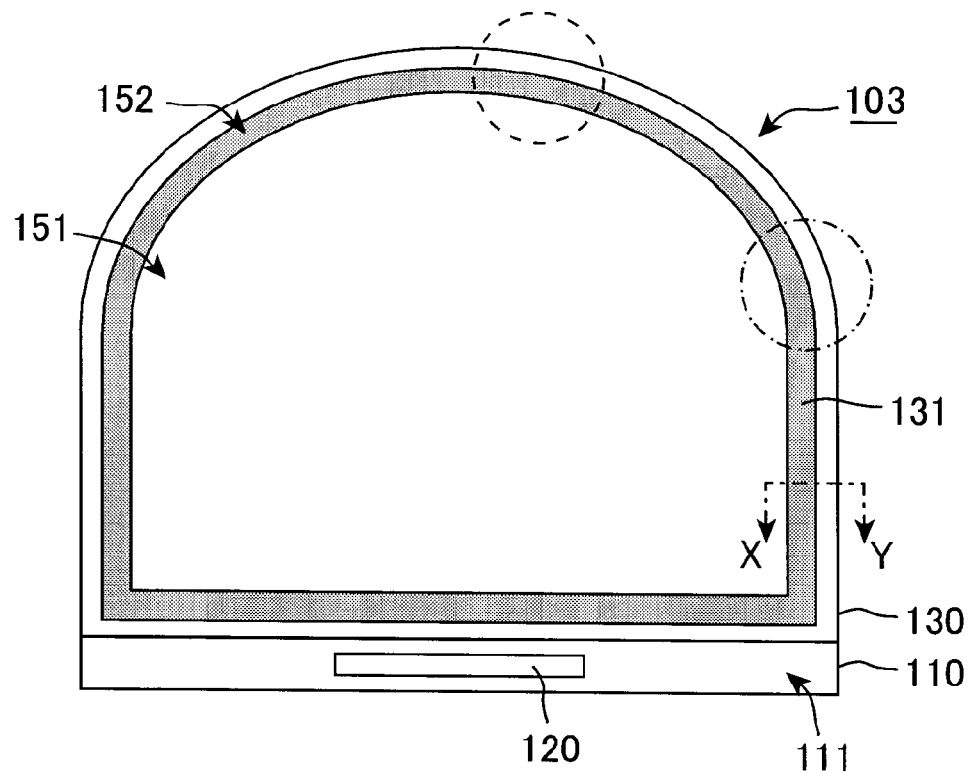
FIG. 5 is a schematic plan view showing the display panel of Preferred embodiment 3.
Figure 6:
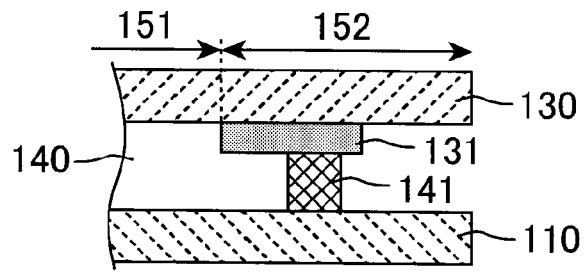
FIG. 6 is a schematic cross-sectional view of the display panel of Preferred embodiment 3 and shows a cross section taken along line X-Y in FIG. 5.
Figure 7:
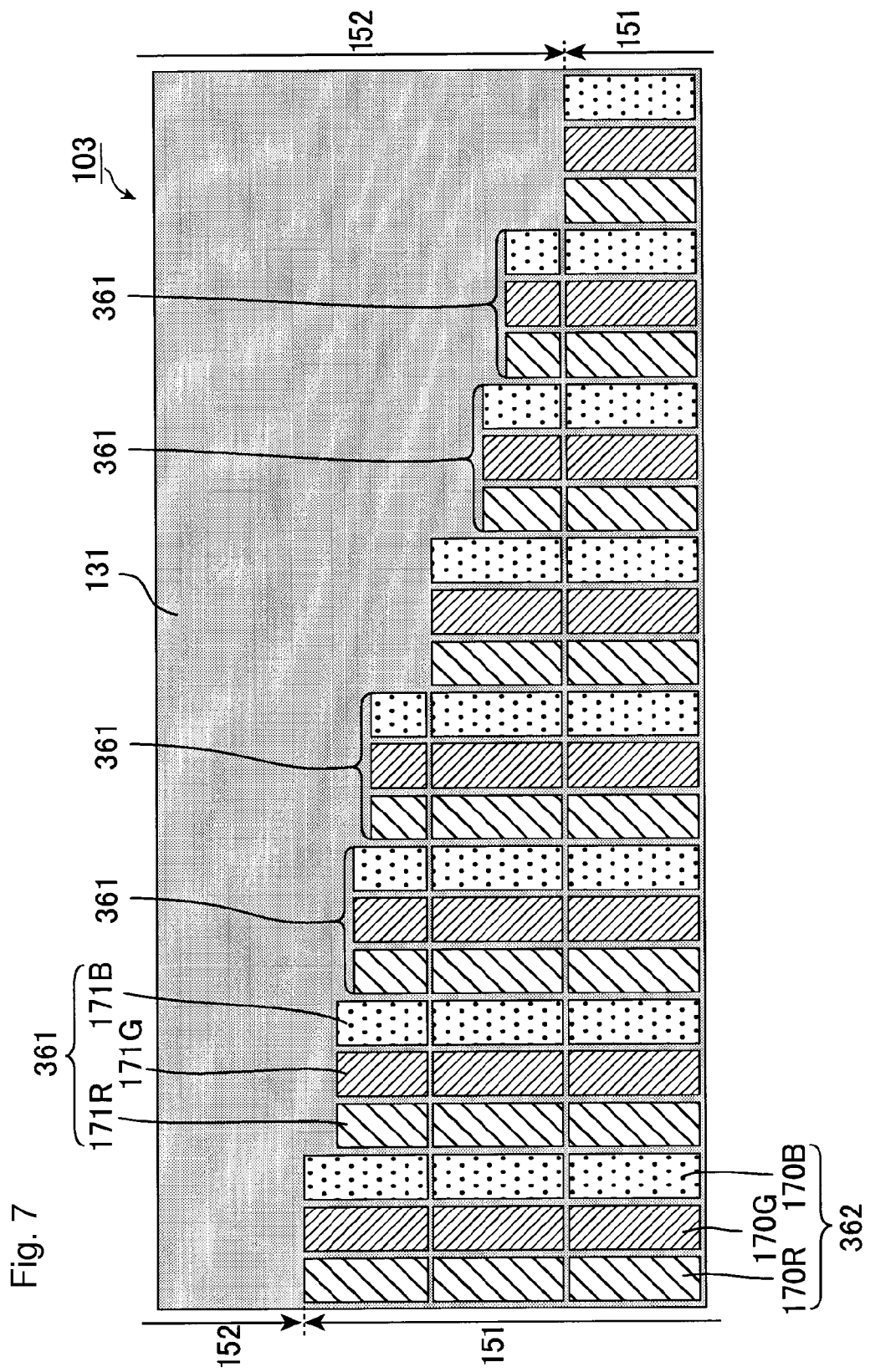
FIG. 7 is an enlarged schematic plan view showing a curved part of the display panel of Preferred embodiment 3 and shows the region indicated by dotted lines in FIG. 5.
Figure 8:
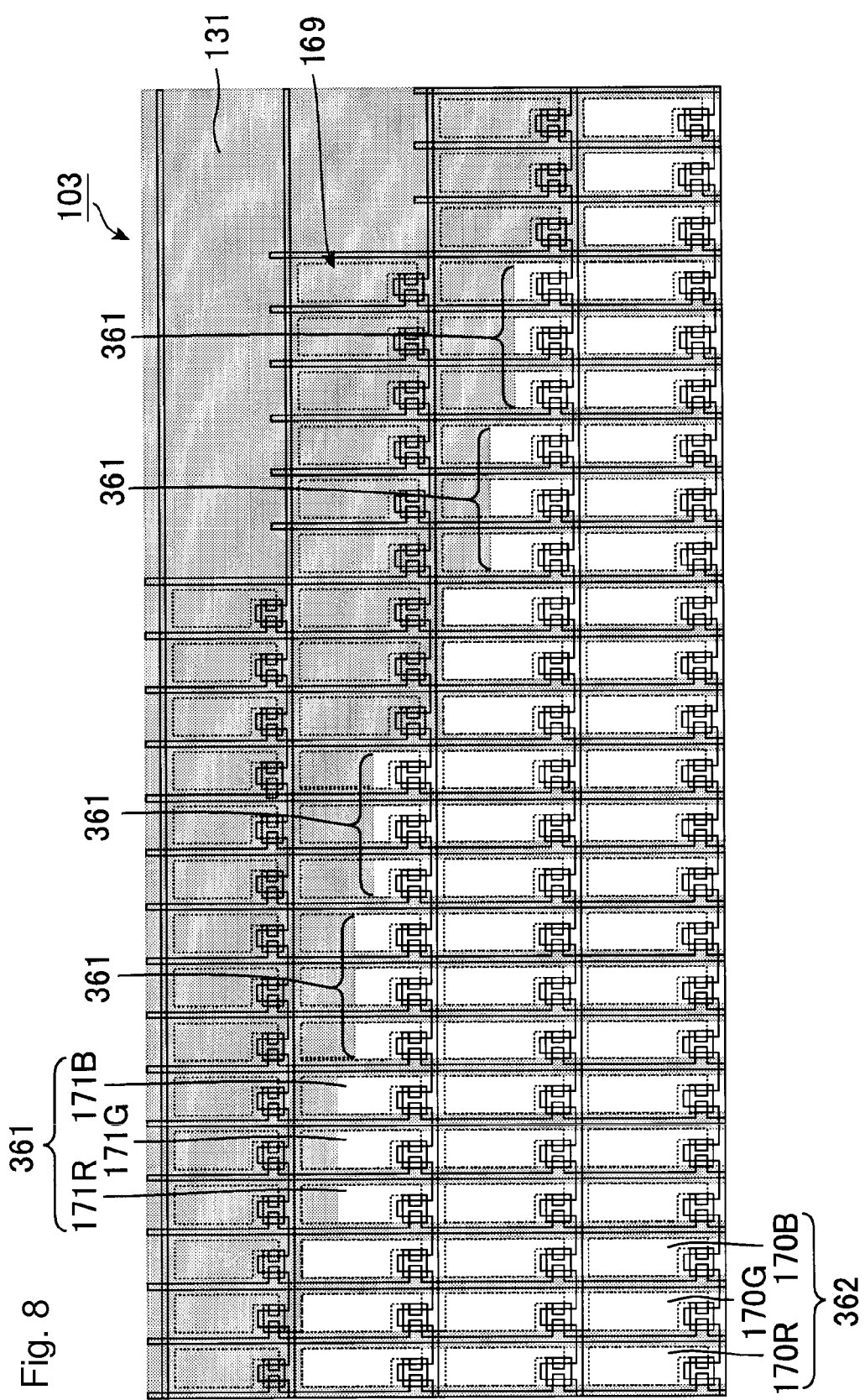
FIG. 8 is an enlarged schematic plan view showing the configuration of the curved part of the display panel of Preferred embodiment 3 and shows the same region indicated by dotted lines in FIG. 5 as in FIG. 7.
Figure 9:
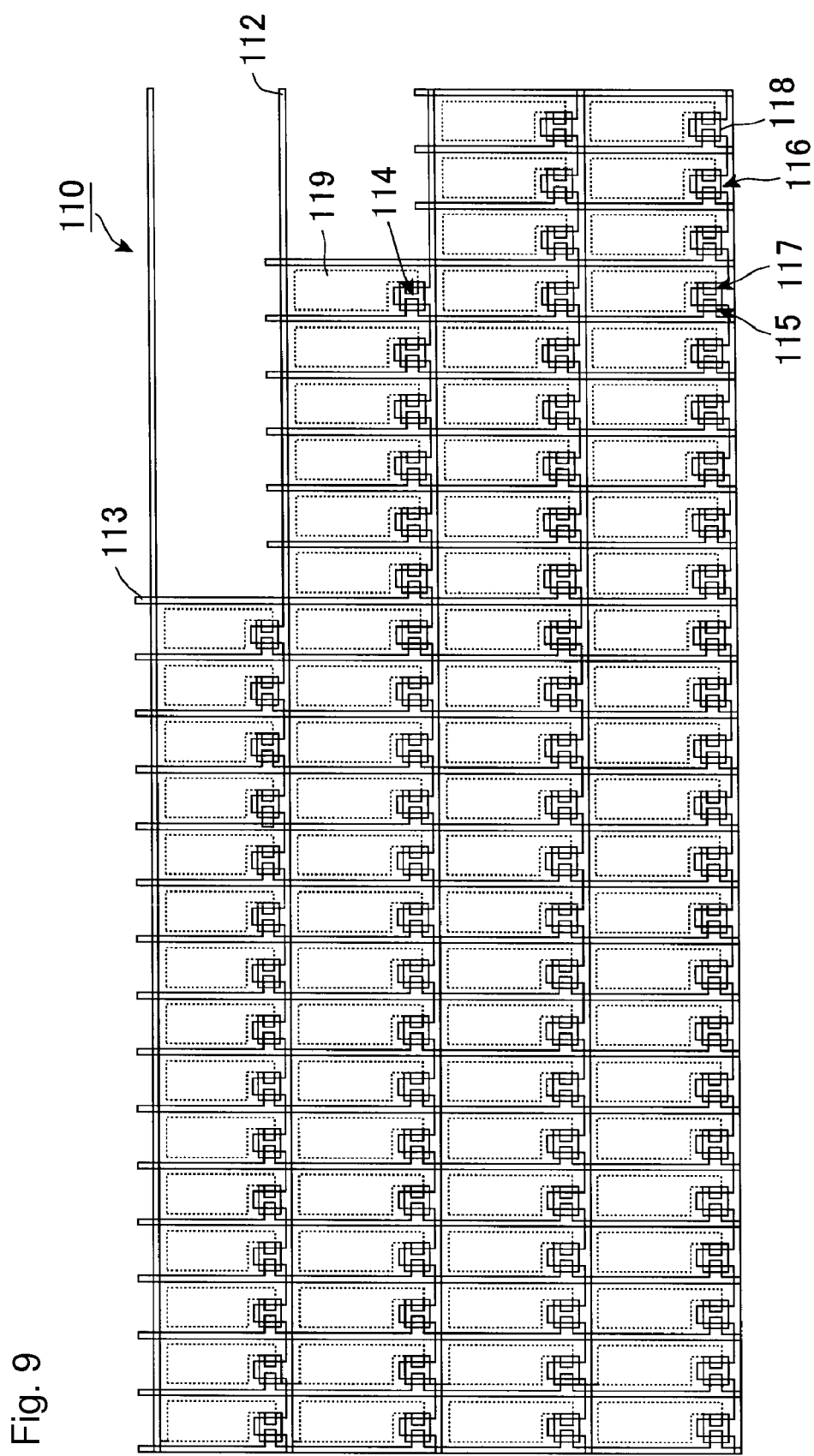
FIG. 9 is an enlarged schematic plan view showing the configuration of the display panel of Preferred embodiment 3 shown in FIG. 8 on the side of an active matrix substrate.
Figure 10:
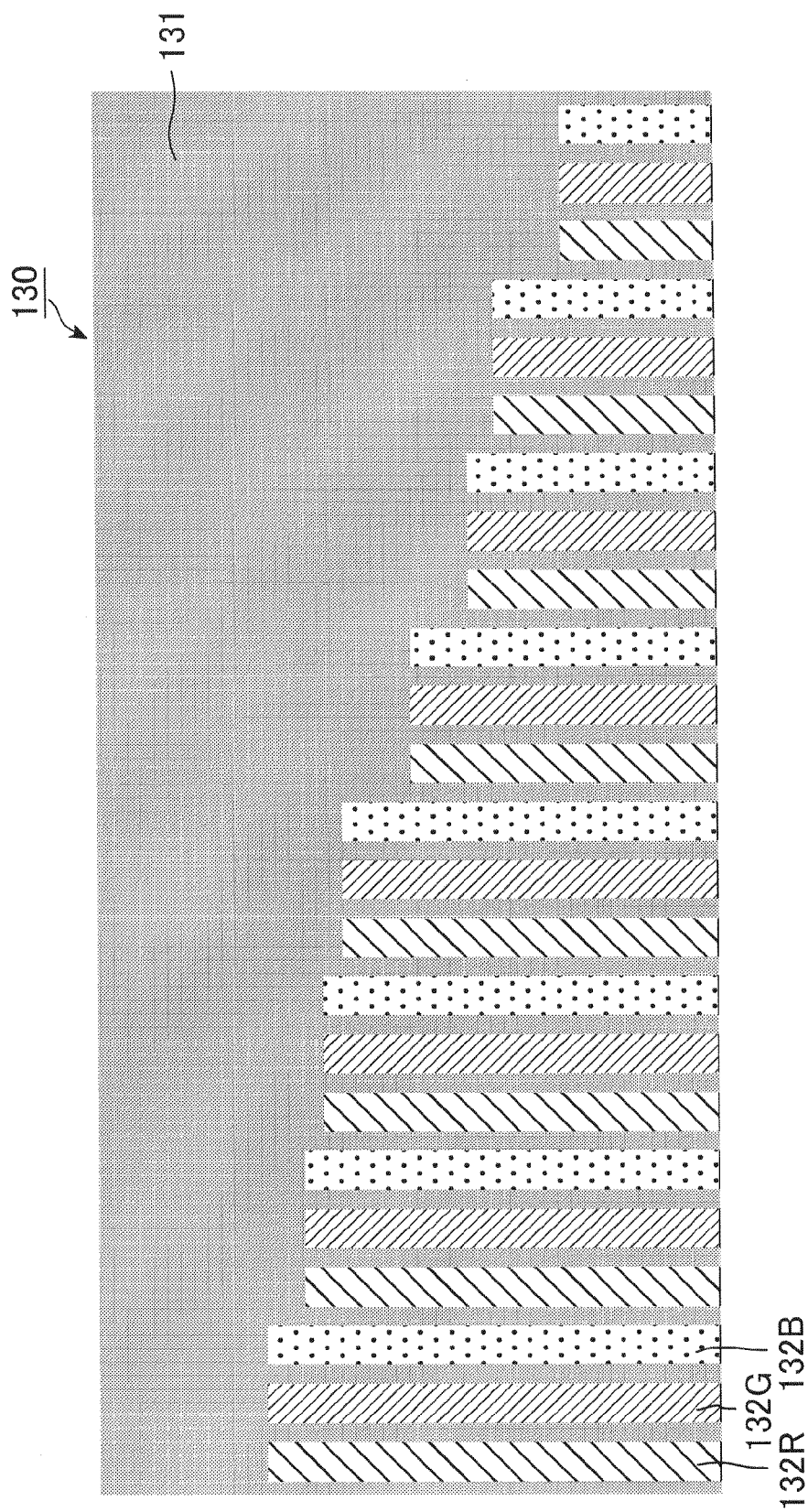
FIG. 10 is an enlarged schematic plan view showing the configuration of the display panel of Preferred embodiment 3 shown in FIG. 8 on the side of a counter substrate.
Figure 11:
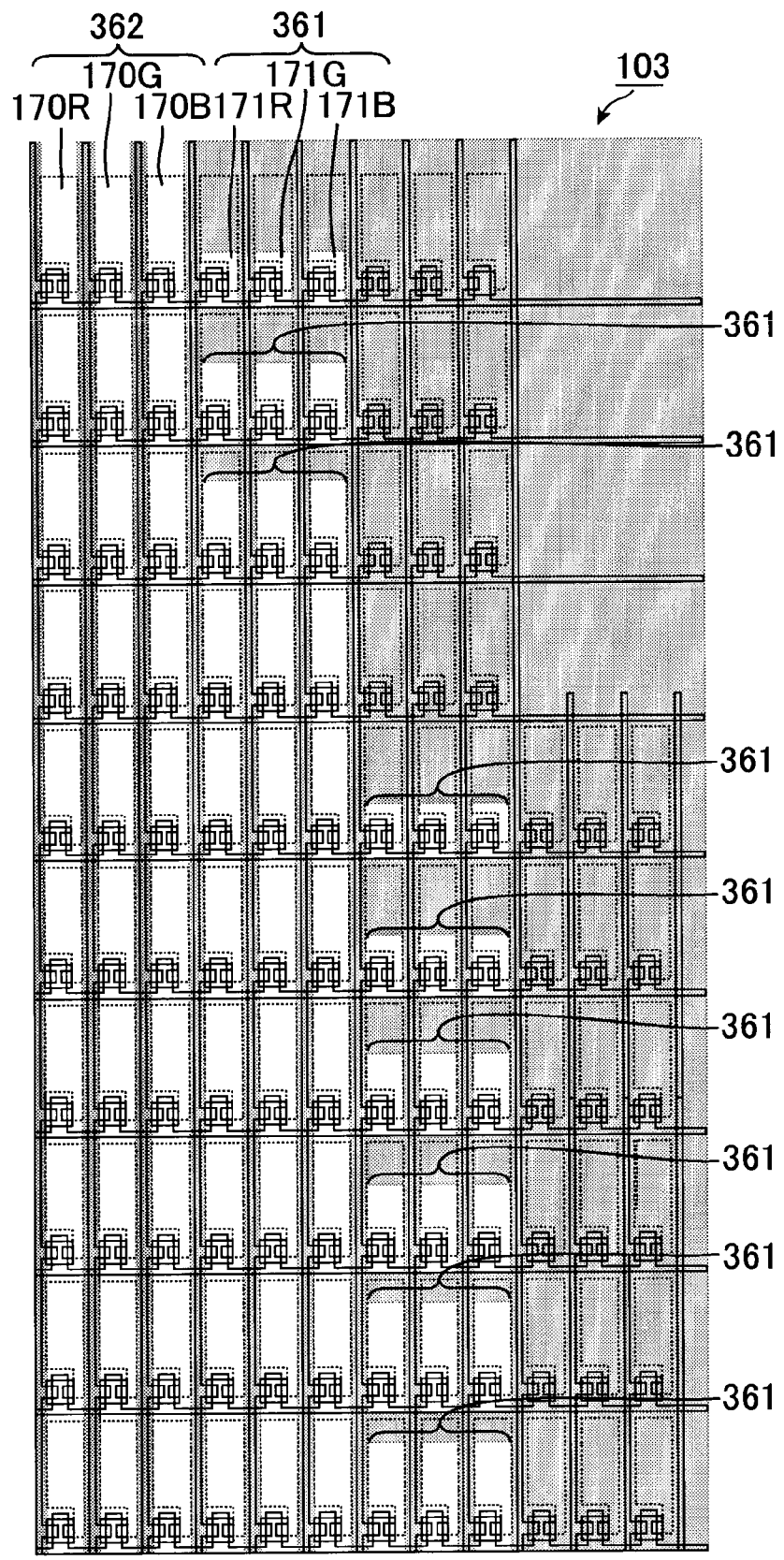
FIG. 11 is an enlarged schematic plan view showing the configuration of the curved part of the display panel of Preferred embodiment 3 and shows the region indicated by dash-dot lines in FIG. 5.

Preferred embodiment 3 of the present invention is mentioned with reference to FIGS. 5 to 11. FIG. 5 is a schematic plan view of the display panel of Preferred embodiment 3. FIG. 6 is a schematic cross-sectional view of the display panel of Preferred embodiment 3 and shows a cross section taken along line X-Y in FIG. 5. FIG. 7 is an enlarged schematic plan view showing a curved part of the display panel of Preferred embodiment 3 and shows the region indicated by dotted lines in FIG. 5. FIG. 8 is an enlarged schematic plan view showing the configuration of the curved part of the display panel of Preferred embodiment 3 and shows the same region indicated by the dotted lines in FIG. 5 as in FIG. 7. FIG. 9 is an enlarged schematic plan view indicating the configuration of the display panel of Preferred embodiment 3 shown in FIG. 8 on the side of an active matrix substrate. FIG. 10 is an enlarged schematic plan view showing the configuration of the display panel of Preferred embodiment 3 shown in FIG. 8 on the side of a counter substrate. FIG. 11 is an enlarged schematic plan view showing the configuration of the curved part of the display panel of Preferred embodiment 3 and shows the region indicated by dash-dot lines in FIG. 5. It is to be noted that, in the present Preferred embodiment, the same number is assigned to the member having the same function in Preferred embodiments 1 and 2.

As shown in FIGS. 5 and 6, a display panel 103 of the present Preferred embodiment is a liquid crystal display panel comprising: a pair of substrates each including a curved shape when viewed in a plane, which are an active matrix substrate 110 and a counter substrate 130; a liquid crystal layer 140 sandwiched between the active matrix substrate 110 and the counter substrate 130; a sealing material 141 placed along the contour line of the counter substrate 130 and between the active matrix substrate 110 and the counter substrate 130; and a black matrix (BM) 131 as a light-shielding member provided on the counter substrate 130 and along the contour line of the counter substrate 130.

In the display panel 103, the region surrounded by the BM 131 has a plurality of pixels arranged in a matrix array. This region is a display region (display area) 151. As thus described, the contour of the display region 151 is preferably defined by the BM 131; thereby, the display panel 103 is more easily produced. On the other hand, the region outside of the BM 131 is a region for displaying nothing, namely a frame region (non-display area) 152.

In addition, the active matrix substrate 110 has a flared part 111 outside of the region defined by the sealing material 141. In the flared part 111, a driver 120 connected to a TFT of each pixel via a later-described bus wiring is placed.

The active matrix substrate 110 is a so-called TFT array substrate. As shown in FIG. 9, the active matrix substrate 110 includes a curved shape when viewed in a plane. On an insulating substrate (not illustrated) made of a transparent glass, a transparent resin or the like, a scanning line 112 and a data signal line 113, which are bus wirings and made of a metal such as chrome, are placed so as to intersect in a matrix array by interposing an insulating film (not illustrated) made of oxide silicon or the like. A TFT 114 is placed on each intersection. Further, a pixel electrode 119 comprising a transparent conductive film such as an ITO is placed in a region defined by the scanning line 112 and the data signal line 113. The TFT 114 is a bottom gate-type TFT comprising: a source electrode 115 extended from the data signal line 113; a gate electrode 116 extended from the scanning line 112; a drain electrode 117 made of a metal such as chrome; and a semiconductor active layer 118 comprising an island-shaped silicon or the like. It is to be noted that the TFT 114 may be of a Channel-Etch type or a Channel-Passivation type. The pixel electrode 119 is connected to the drain electrode 117 and an image signal is supplied thereto from the data signal line 113 via the TFT 114. As a result, in the display panel 103, the liquid crystal in each pixel is individually controllable so as to enable various displays.

On the other hand, the counter substrate 130 is a so-called color filter substrate (CF substrate). As shown in FIG. 10, the counter substrate 130 includes a curved shape when viewed in a plane. On an insulating substrate (not illustrated) made of a transparent glass, a transparent resin or the like, there are placed a BM 131 made of a metal such as chrome or a black resin; RGB color filters 132R, 132G, and 132B made of a resin containing a pigment or a dye, and are provided in stripes (in rectangles) in regions defined by the BM 131; and a counter electrode (a common electrode, not illustrated) comprising a transparent insulating film such as an ITO, which is placed at least in the region corresponding to the display region 151. As thus described, the counter substrate 130 has color filters arranged in a strip array. It is to be noted that, in the display region 151, the BM 131 is linearly (in slits) provided in a vertical direction (drawing direction of the data signal line 113) corresponding to the boundaries of respective sub-pixels.

The plurality of pixels arranged in a matrix array in the display region 151 comprise a plurality of normal-sized inner pixels 362 provided in the inner region of the display region 151 and a plurality of pixels 361 for a contour provided along the contour section of the display region 151. As shown in FIGS. 7 and 8, the inner pixel 362 comprises three RGB sub-pixels 170R, 170G, and 170B arranged in parallel, and each pixel 361 for a contour comprises three RGB sub-pixels 171R, 171G, and 171B arranged in parallel. The inner pixels 362 constitute the majority of the display region 151 and mainly conduct image display. In each of the inner pixel 362 and the pixels 361 for a contour, the area in which a light-shielding member such as the BM 131 and the scanning line 112 is not placed and the pixel electrode 119 is placed is an opening region (aperture region), namely, the region that can emit light. The data signal line 113 is extended in the vertical direction of the display panel 103 seen from the front, along the boundaries between the sub-pixels adjacent in the horizontal direction of the display panel 103 seen from the front. On the other hand, the scanning line 112 is extended in the horizontal direction of the display panel seen from the front, along the boundaries between the sub-pixels adjacent in the vertical direction of the display panel 103 seen from the front.

In the display panel 103, dummy pixels 169 are placed at least in a single ring around the pixels constituting the display region 151. It is to be noted that the dummy pixels 169 are not visually observed as they are placed at the position overlapping the frame region 152, namely, the BM 131. The similar bus wiring as that in the pixels (including the later-described pixels 361 for a contour) constituting the display region 151 drive and control the dummy pixels 169. Accordingly, it is possible to equalize the volume of the capacitance of the liquid crystal of the pixel placed in the outermost periphery of the display region 151 with the volume of the capacitance of the liquid crystal of the pixel placed in the center part of the display region 151. As a result, display unevenness in the frame section of the display region 151 can be prevented.

The display panel 103 has a pair of polarizers (not illustrated) on the principal surface of the exterior of the active matrix substrate 110 and the counter substrate 130. Further, alignment layers (not illustrated) are provided on the surfaces of the active matrix 110 and the counter substrate 130 on the side of the liquid crystal layer 140. It is to be noted that a viewing angle compensating film such as a retardation film may be placed between the polarizer and at least one of the active matrix 110 and the counter substrate 130.

The liquid crystal mode of the display panel 103 is not specifically limited, and examples thereof include TN (Twist Nematic) mode, IPS (In Plane Switching) mode, VATN (Vertical Alignment Twisted Nematic) mode, VAECB (Vertical Alignment Electrically Controlled Birefringence) mode. In the display panel 103, each pixel may be domain divided.

In addition, the number and the combination of colors of sub pixels 170R, 170G, and 170B each constituting the inner pixel 362 and sub pixels 171R, 171G, and 171B each constituting each pixel 361 for a contour are not especially limited to three colors of RGB. For example, colors of cyan, yellow, and magenta may be employed. Further, four or more colors may be used.

The inner pixels 362 are placed stepwise along the contour of the display region 151. As shown in FIGS. 7 and 8, the aperture shape of each pixel 361 for a contour is defined by a light-shielding member such as the BM 131 so that the aperture area is smaller than that of the inner pixel 362. More specifically, the aperture area of each pixel 361 for a contour (total of the aperture areas of the sub pixels 171R, 171G, and 171B constituting each pixel 361 for a contour) is set to be smaller than the aperture area of the inner pixel 362 (total of the aperture areas of the sub pixels 170R, 170G, and 170B constituting the inner pixel 362). Accordingly, use of the pixels 361 for a contour and the inner pixels 362 allows the display panel 103 to have the display region with a smooth and nearly-curved (gentle step-wise) contour. Namely, the gravity centers of sub-pixels located in the contour section of the display region 151 are allowed to be on a nearly-complete curve. Thus, the contour of the display region is allowed to have a nearly complete curve. As a result, the display region 151 is allowed to have a contour having a better appearance than the display panels of Preferred embodiments 1 and 2. It is to be noted that the aperture shape refers to the shape of the aperture region, namely, the shape of the region that can emit light (an emissive region).

In each pixel 361 for a contour, sub-pixels 171R, 171G, and 171B constituting each pixel 361 for a contour have similar aperture areas. Namely, in each pixel 361 for a contour, sub-pixels 171R, 171G, and 171B are comparably smaller than the corresponding sub-pixels 170R, 170G, and 170B in the inner pixel 362. More specifically, each of the aperture regions of the sub-pixels 171R, 171G, and 171B constituting each pixel 361 for a contour has the length shorter than that of the corresponding aperture region of the sub-pixel 170R, 170G, or 170B constituting the inner pixel 362 in an array direction of the sub-pixels of the same color (in the present Preferred embodiment, vertical direction of the display panel 103 seen from the front) on the side of the frame region 152. Accordingly, the aperture area ratio of the sub-pixels 171R, 171G, and 171B constituting each pixel 361 for a contour is set to be substantially the same as the aperture area ratio of the sub-pixels 170R, 170G, and 170B constituting each inner pixel 362. As a result, coloring is prevented in the pixels 361 for a contour.

In each of the sub-pixels 171R, 171G, and 171B constituting each pixel 361 for a contour, the aperture shape, namely, the contour of the aperture region is defined along the drawing direction of the bus wiring. More specifically, the aperture shape is a shape of combined rectangles. Namely, the contour section of the display region 151 is formed to be stepwise (stepped-shape formed by combining L-shapes and/or inverted L-shapes) with use of the pixels 361 for a contour. This facilitates designing of the pixels 361 for a contour, and therefore, the display panel 103 is easily designed and produced. Compared to the display device disclosed in Japanese Kokai Publication No. 2006-276580, the display region 151 is allowed to have a contour section drawing a curve closer to a complete curve, especially in the case of monochrome display. The contour of each of the sub-pixels 171R, 171G, and 171B constituting each pixel 361 for a contour is not especially limited as long as the contour of the aperture region on the side of the frame region 152 is in parallel with the drawing direction of the bus wiring. All the contours of the aperture region may be set to be in parallel with the drawing direction of the bus wiring, or alternatively, the contour of the aperture region on the side of the display region 151, which does not affect the contour of the display region 151 so much, may be set as appropriate.

Further, in each pixel 361 for a contour, the sub-pixels 171R, 171G, and 171B constituting each pixel 361 for a contour have similar aperture shapes. This facilitates designing of the pixels 361 for a contour, and therefore, the display panel 103 is easily designed and produced.

The aperture area of each pixel 361 for a contour varies stepwise (gradually) along the contour of the display region 151 so that the display region 151 has the desired contour. Thus, the display region 151 is allowed to have a more smoothly curved contour.

Each pixel 361 for a contour is connected to the data wiring and scanning wiring in common with the inner pixel 362, and therefore, the liquid crystal display panel 103 can drive the inner pixels 362 and the pixels 361 for a contour at once.

Further, also in a case where the direction of the contour of the display region 151 is almost along the vertical direction of the display panel 103 seen from the front, as shown in FIG. 11, the display panel 103 has a plurality of the pixels 361 for a contour each having the sub-pixels 171R, 171G, and 171B which have similar aperture areas and the similar aperture shapes. In addition, the aperture area of each pixel 361 for a contour varies gradually along the contour of the display region 151 so that a desired contour is realized. Namely, in a plurality of pixels for forming the contour section including a plurality of the pixels 361 for a contour, the aperture regions are gradated. Accordingly, even in such regions, coloring is prevented and a contour having a good appearance is obtained.

As thus described, in the display panel 103, coloring is prevented in the curved contour section of the display region 151. Further, the aperture shapes of the sub-pixels 171R, 171G, and 171B constituting each pixel 361 for a contour is defined along the drawing direction of the bus wiring, and therefore, the display panel 103 is easily designed and produced. In addition, the display regions 151 having various planar shapes and panels having various planar shapes can be realized by an appropriate setting of the aperture areas of respective adjacent pixels 361 for a contour along the various contours such as a circular arc, an elliptical curve, and an oblique line.

As above described, a light-shielding member such as the BM 131 defines the aperture areas and the aperture shapes of the pixel for a contour and of the sub-pixels 171R, 171G, and 171B constituting each pixel 361 for a contour. Accordingly, use of the BM 131 as the light-shielding member for defining the aperture area and the aperture shape easily adjusts the aperture areas and the aperture shapes of the pixels 361 for a contour and of the sub-pixels 171R, 171G, and 171B.

Figure 12:
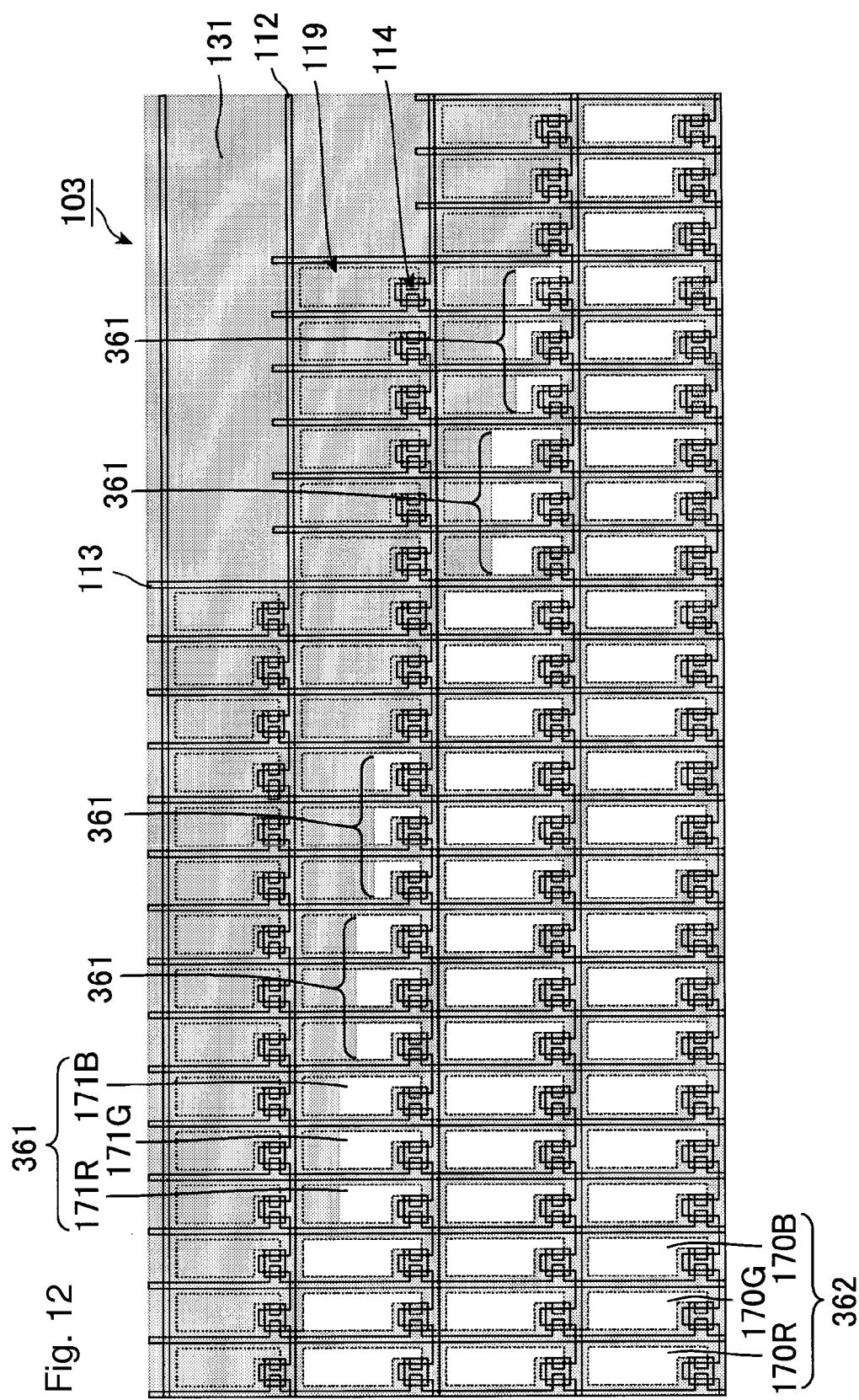
FIG. 12 is an enlarged schematic plan view showing the configuration of the curved part of a variation of the display panel of Preferred embodiment 3 and shows the region indicated by dotted lines in FIG. 5.
Figure 13:
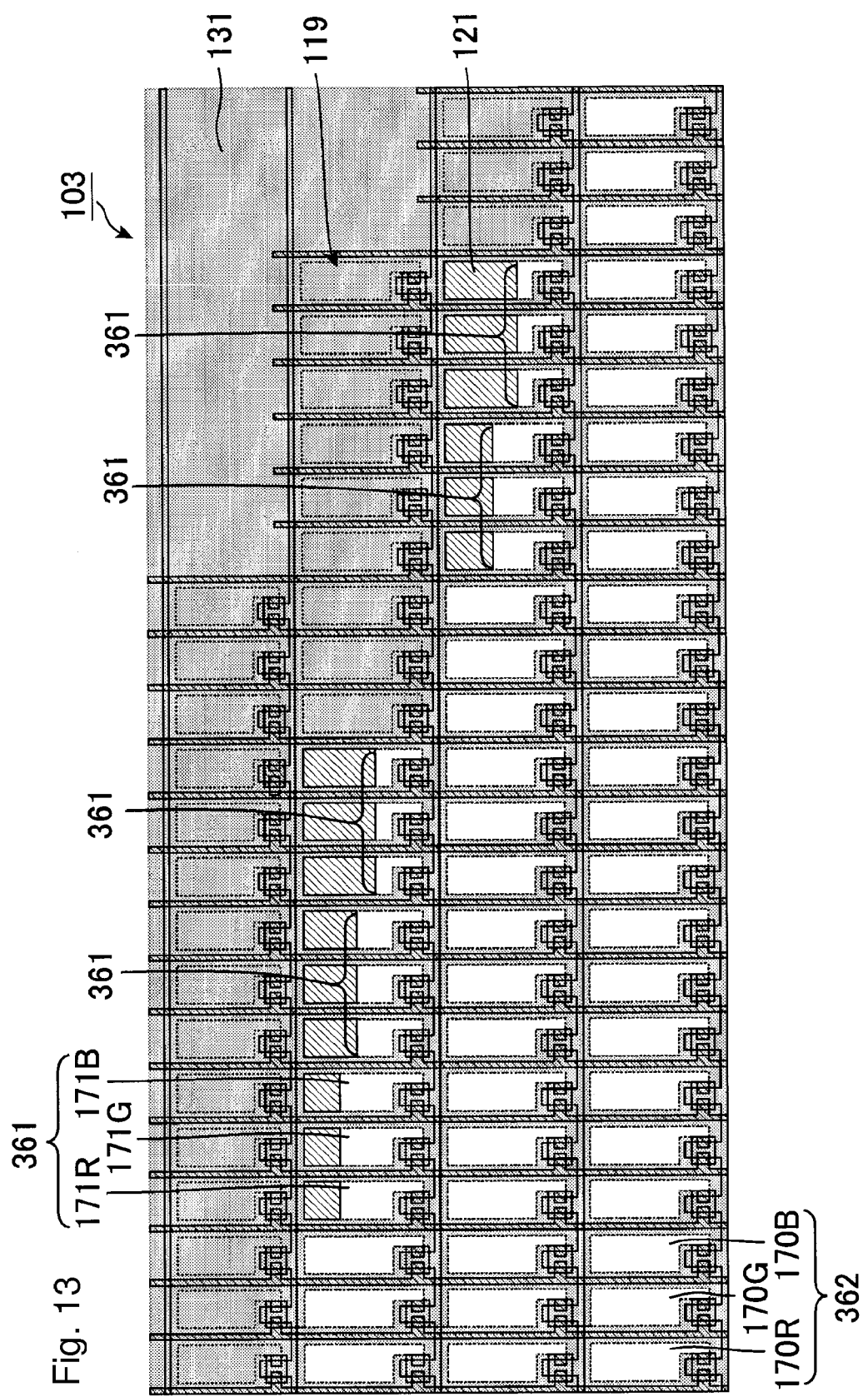
FIG. 13 is an enlarged schematic plan view showing the configuration of the curved part of a variation of the display panel of Preferred embodiment 3 and shows the region indicated by dotted lines in FIG. 5.
Figure 14:
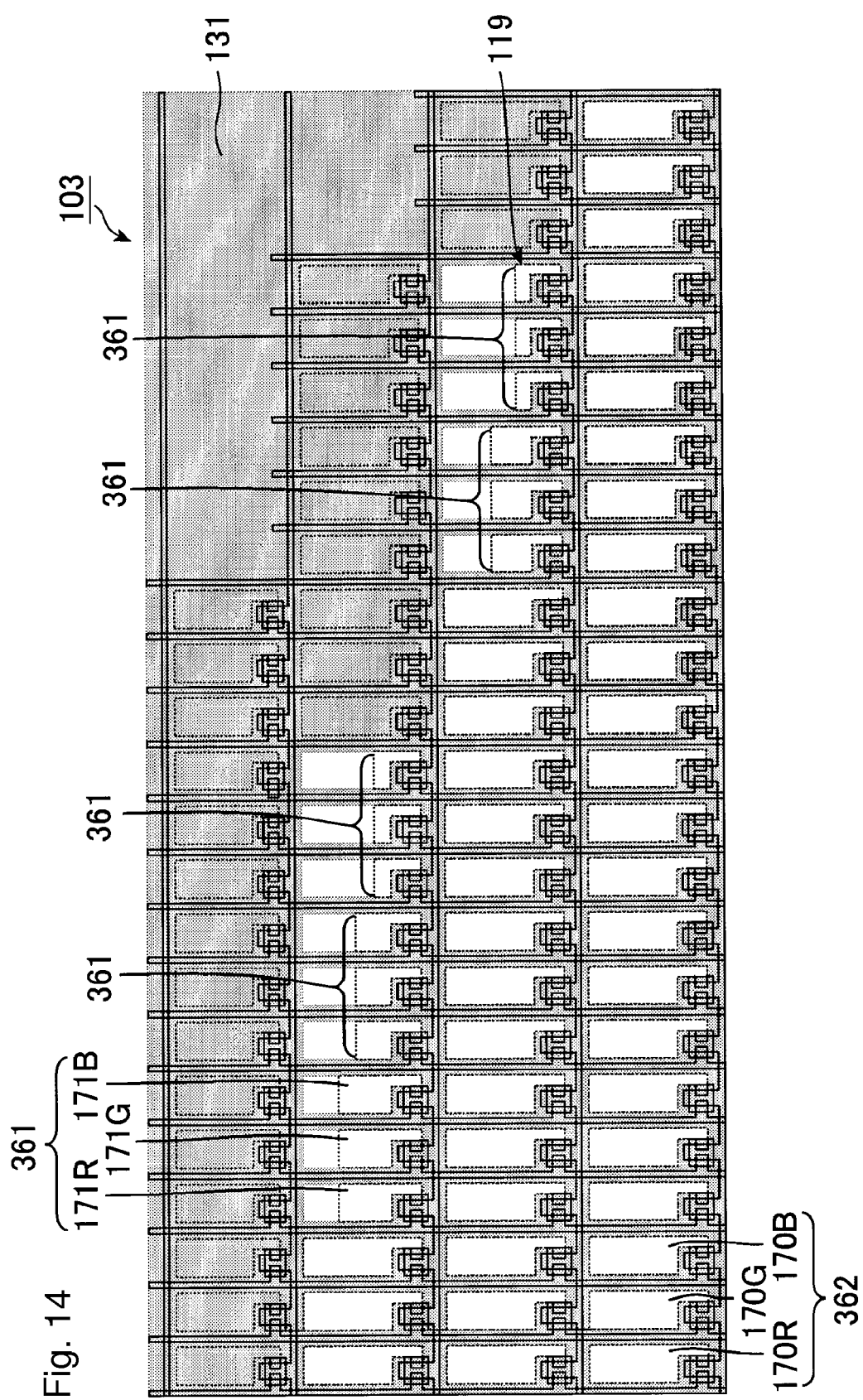
FIG. 14 is an enlarged schematic plan view showing the configuration of the curved part of a variation of the display panel of Preferred embodiment 3 and shows the region indicated by dotted lines in FIG. 5.
Figure 15:
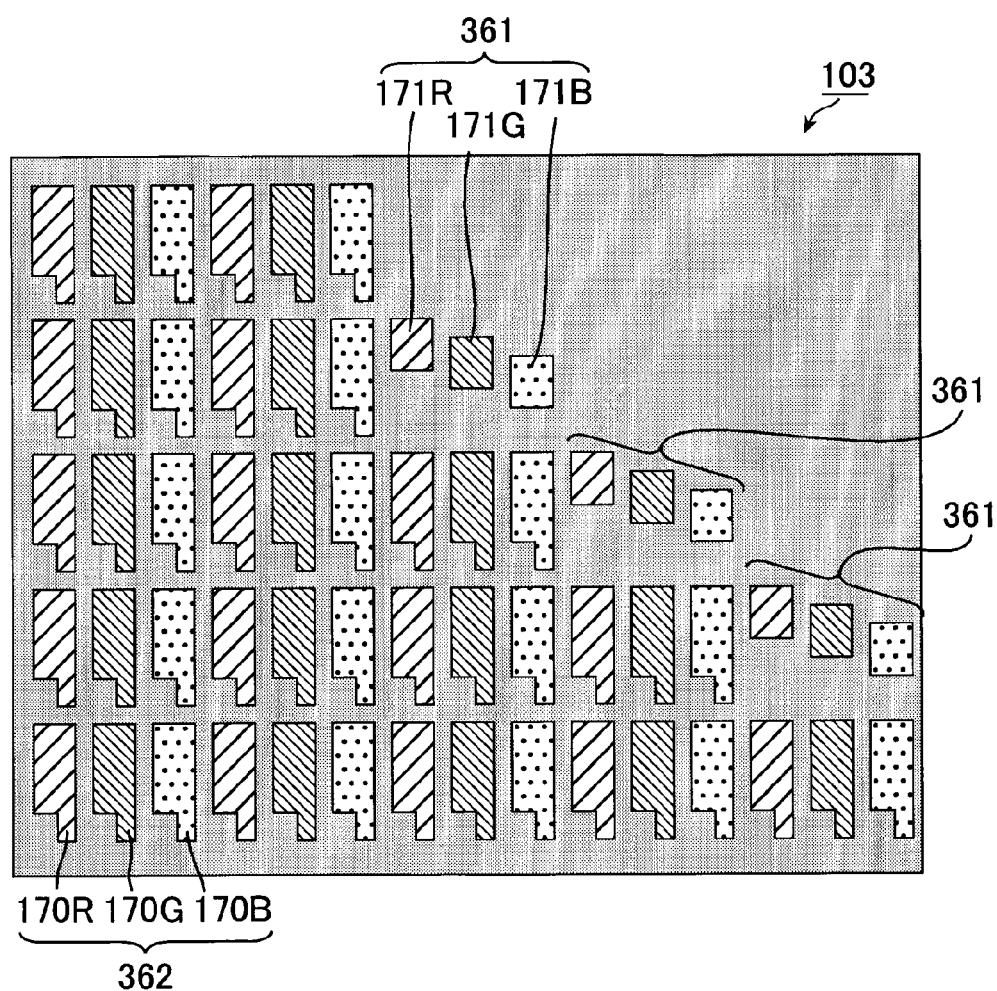
FIG. 15 is a schematic plan view showing a variation of the display panel of Preferred embodiment 3.
Figure 16:
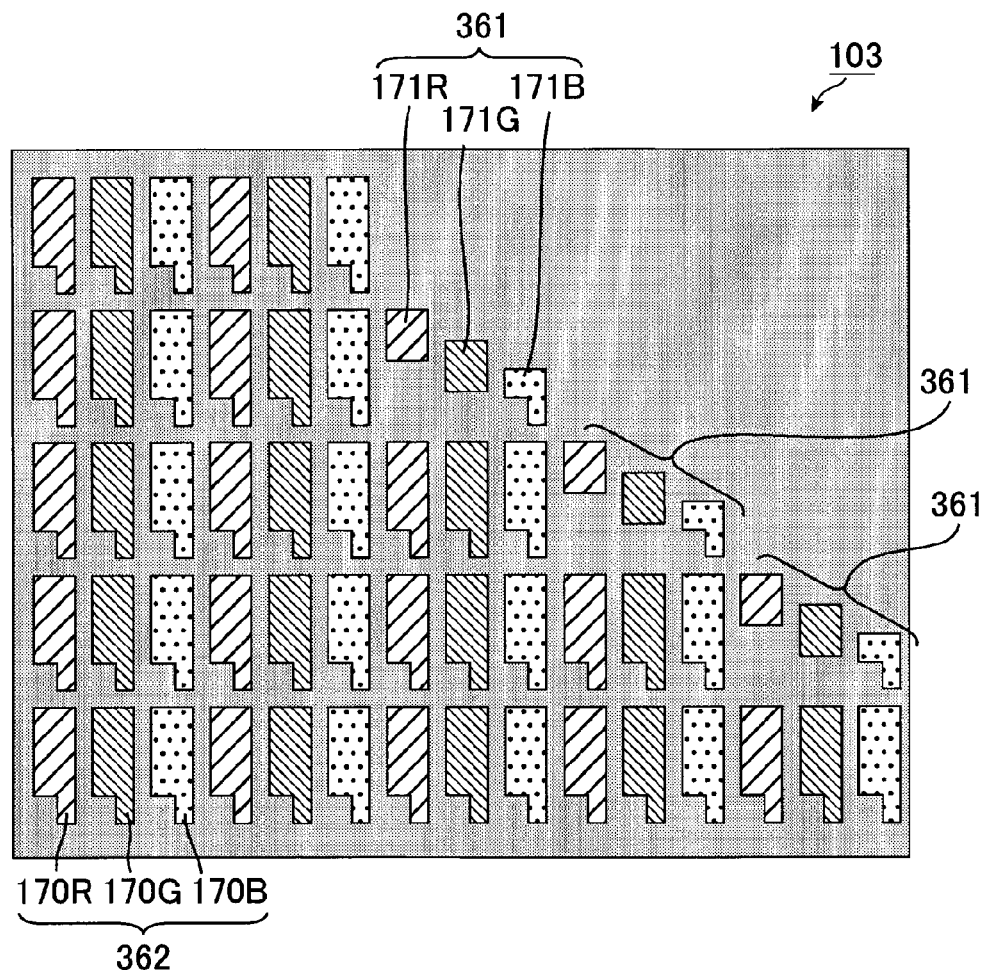
FIG. 16 is a schematic plan view showing a variation of the display panel of Preferred embodiment 3.
Figure 17:
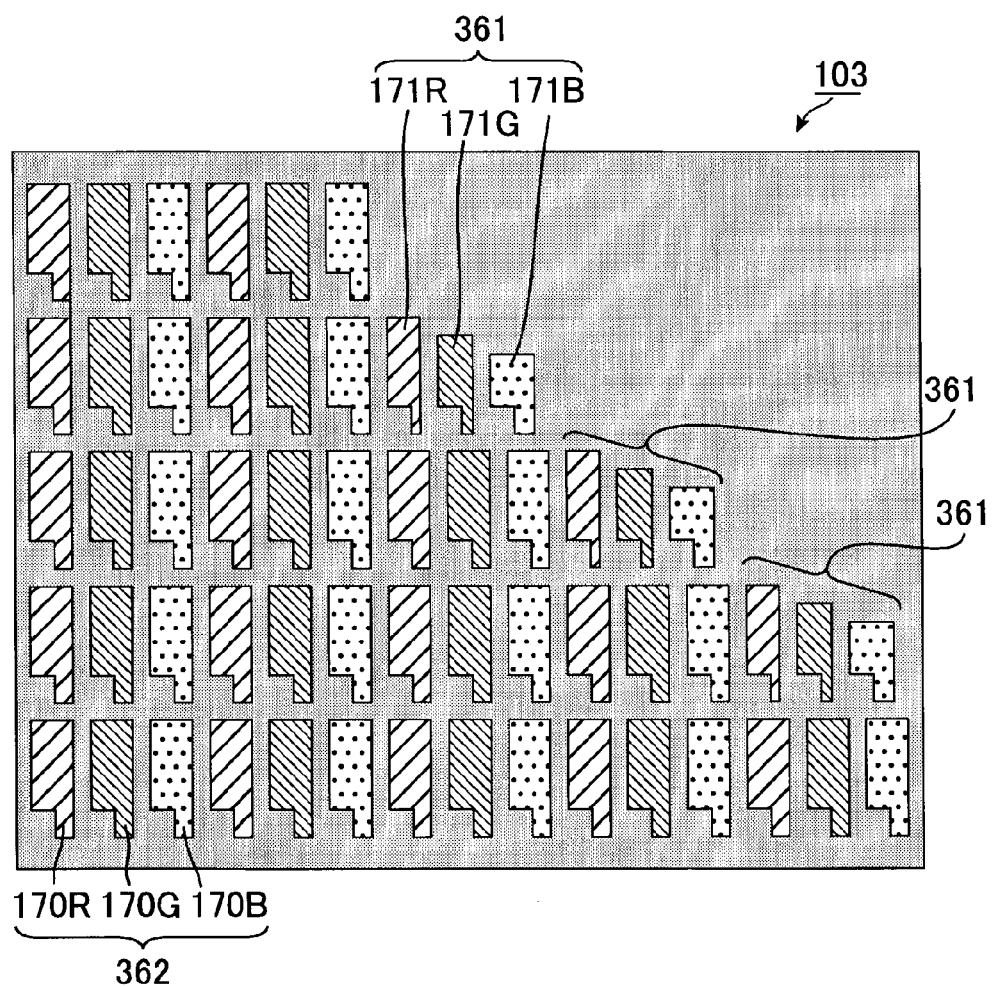
FIG. 17 is a schematic plan view showing a variation of the display panel of Preferred embodiment 3.
Figure 18:
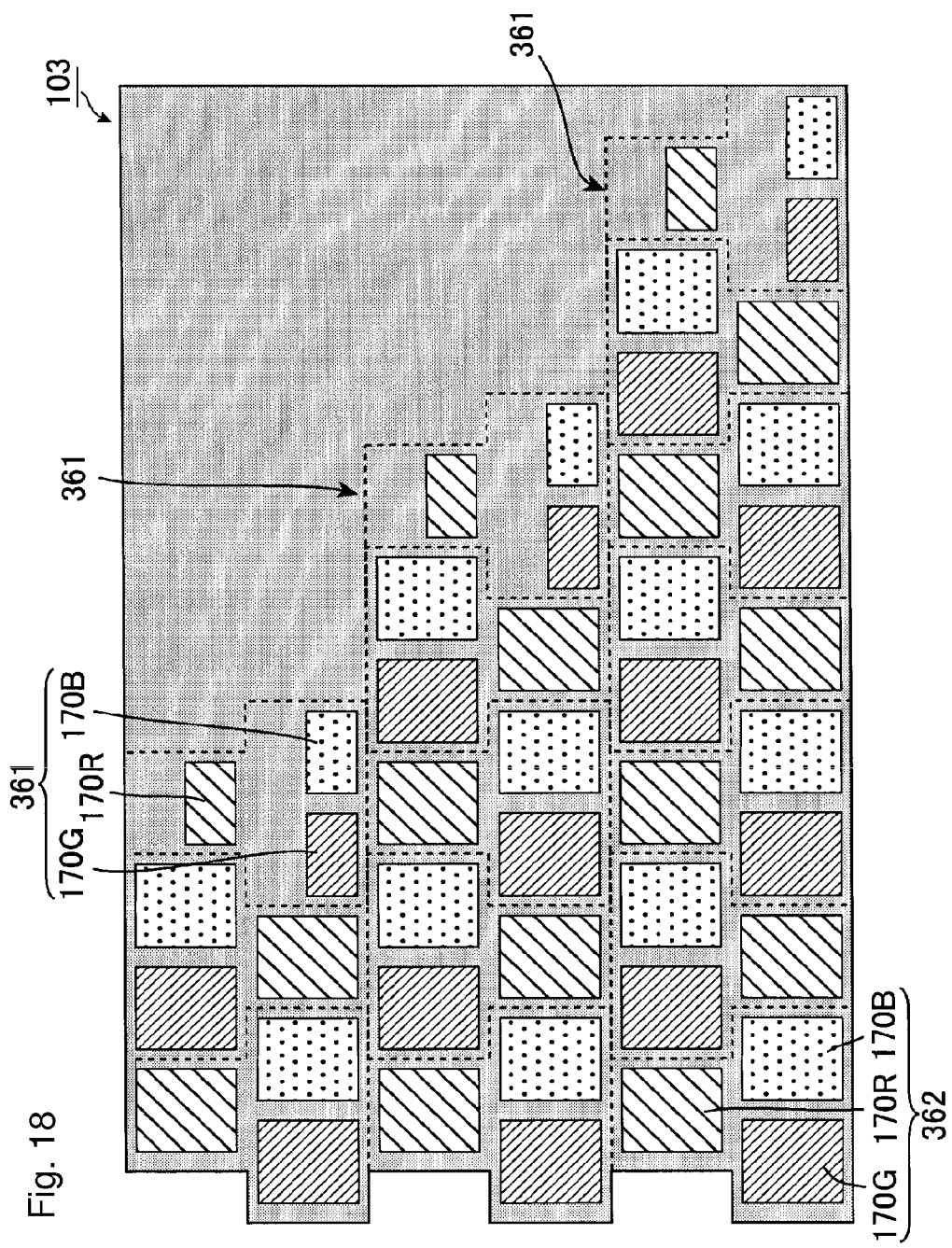
FIG. 18 is a schematic plan view showing a variation of the display panel of Preferred embodiment 3.
Figure 19:
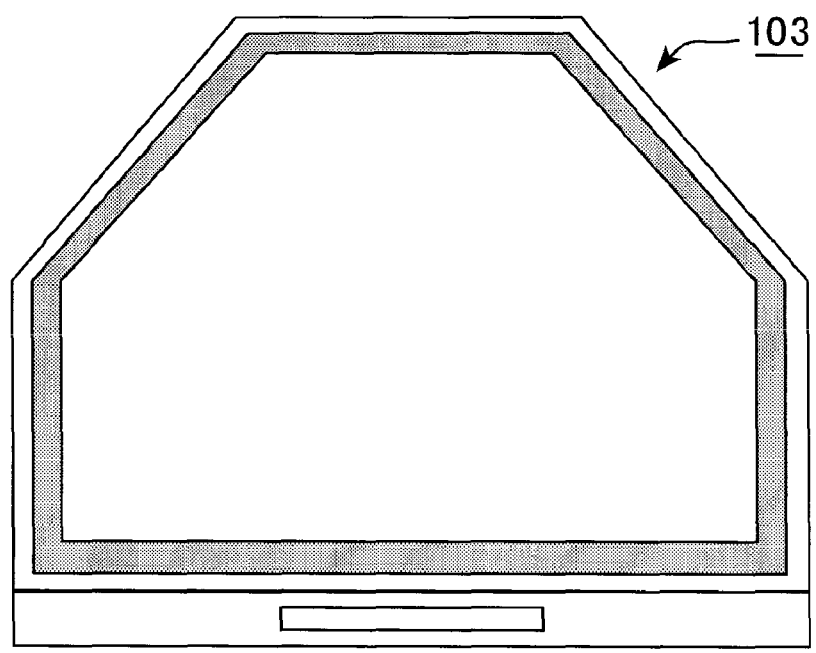
FIG. 19 is a schematic plan view showing a variation of the display panel of Preferred embodiment 3.

In the following, a variation of the liquid crystal display panel 103 is described with reference to FIGS. 12 to 19. FIGS. 12 to 14 are enlarged schematic plan views each showing the configuration of the curved part of the variation of the display panel of Preferred embodiment 3, specifically showing the region defined by dotted lines in FIG. 5. FIGS. 15 to 17 are schematic plan views each showing a variation of the display panel of Preferred embodiment 3. FIG. 18 is a schematic plan view showing a variation of the display panel of Preferred embodiment 3. FIG. 19 is a schematic plan view showing a variation of the display panel of Preferred embodiment 3. It is to be noted that the region defined by dotted lines in FIG. 18 refers to a single pixel.

The BM 131 may be provided in a grid so as to shield the boundary regions of sub-pixels horizontally adjacent to one another (in a drawing direction of the scanning line 112) and the TFT 114 as shown in FIG. 12, in addition to the boundary regions of sub-pixels vertically adjacent to one another (in a drawing direction of the data signal line 113). In this case, in each pixel 361 for a contour in which the TFT 114 is located on the side of the display region 151, the aperture shape of each of the sub-pixels 171R, 171G, and 171B constituting each pixel 361 for a contour on the side of the display region 151 may be set as appropriate. For example, the contour of the BM 131 in a part shielding the TFT 114 may be set to be oblique with respect to the drawing direction of the data signal line 113.

As a light-shielding member, in addition to the BM 131, a light-shielding metal layer for forming the bus wiring (e.g. scanning line) provided on the active matrix substrate 110, another light-shielding metal layer additionally provided on the active matrix substrate 110, or the like may be used. More specifically, the aperture areas and aperture shapes of the sub-pixels 171R, 171G, and 171B constituting each pixel 361 for a contour may be adjusted by a light-shielding metal layer 121 formed by the same wiring layer of the scanning line 112 or the data signal line 113 as shown in FIG. 13. Further, the aperture areas and aperture shapes of the sub-pixels 171R, 171G, and 171B constituting each pixel 361 for a contour may be adjusted by change in the shape and the area of the pixel electrode 119. Use of the metal layer 121 as a light-shielding member can reduce the area of the BM 131 in each of the sub-pixels 171R, 171G, and 171B. In addition, the method is applicable to a panel on which a BM cannot be provided, namely, a display without a BM. Therefore, a counter substrate (CF substrate) is easily produced. Adjustment of the aperture area and aperture shape of each pixel 361 for a contour by the pixel electrode 119 can also reduce the area of the BM 131 in each of the sub-pixels 171R, 171G, and 171B, in the same manner as in the case of using the metal layer 121 as a light-shielding member. In addition, the method is applicable to a panel on which a BM cannot be provided, namely, a display without a BM. Therefore, a counter substrate (CF substrate) is easily produced. In a case where the aperture area and aperture shape of each pixel 361 for a contour are adjusted by the pixel electrode 119, the display panel 103 is preferably a normally-black display from the standpoint of preventing light leakage in the region adjacent to the pixel 361 for a contour, in which the pixel electrode 119 is not provided. The aperture area and/or aperture shape of each pixel 361 for a contour may be set by adjusting the layout of both a light-shielding member and the pixel electrode 119.

As shown in FIG. 15, the sub-pixels 171R, 171G, and 171B constituting each pixel 361 for a contour may have similar aperture shapes and may be placed stepwise in the vertical direction (direction along which sub-pixels of the same color are arranged). Further, as shown in FIG. 16, the sub-pixels 171R, 171G, and 171B constituting each pixel 361 for a contour may have different aperture shapes and may be placed stepwise in the vertical direction (direction along which sub-pixels of the same color are arranged). Furthermore, as shown in FIG. 17, the sub-pixels 171R, 171G, and 171B constituting each pixel 361 for a contour have sub-pixel pitches in the horizontal direction (direction vertical to the direction along which sub-pixels of the same color are arranged) set to be smaller than sub-pixel pitches of the sub-pixels 170R, 170G, and 170B constituting the inner pixel 362 in the same direction. Further, the length of the aperture regions in the vertical direction (direction along which sub-pixels in the same color are arranged) is gradually varied. Thus, the sub-pixels 171R, 171G, and 171B may be arranged stepwise along the contour section of the display region 151. In a case shown in FIG. 17, the sub-pixel having a vertically shorter aperture region preferably has a horizontally longer sub-pixel pitch. Accordingly, the sub-pixels 171R, 171G, and 171B in each pixel 361 for a contour easily have similar aperture area. Among the plurality of pixels 361 for a contour shown in FIGS. 15 to 17, the aperture area of the adjacent pixels 361 for a contour may be set to be different as appropriate. As thus described, the pixels 361 for a contour having various configurations shown in FIGS. 15 to 17 and in FIG. 7 may be appropriately selected according to the desired contour shape of the display region 151 in each pixel 361 for a contour. Thus, the display panel 103 is allowed to have the display region 151 with a contour section having a better appearance.

The pixel array in the display panel 103 of the present Preferred embodiment is not specifically limited to a stripe array as long as it is a common pixel array. It may also be a delta array, a mosaic array, or the like. More specifically, in the display panel 103, as shown in FIG. 18, the inner pixel 362 may be constituted by the sub pixels 170R, 170G, and 170B arranged in the delta array. In each pixel 361 for a contour, the sub-pixels 170R, 170G, and 170B arranged in the delta array may have similar aperture areas. The aperture shapes of the sub pixels 171R, 171G, and 171B arranged in the delta array at least on the side of the frame region 152 may be defined along the drawing direction of the bus wiring. The aperture area of each pixel 361 for a contour may be set to be smaller than the aperture area of the inner pixel 362. As a result, the similar effect as that exerted in the case of the stripe array can be exerted.

As the planar shape of the display panel 103 and the planar shape (contour shape) of the display region 151, the shape of a rectangle with two adjacent angles cut obliquely as shown in FIG. 19 may be employed in addition to the shape of a rectangle with two adjacent angles rounded off as shown in FIG. 5. The liquid crystal display panels for an in-car instrumental panel suitably have these shapes. It is to be noted that the planar shape of the display panel 103 and the planar shape of the display region 151 are not especially limited. The shape may be set as appropriate depending upon the application and the desired design.

A method for producing the display panel 103 is not specifically limited, and a common production process of liquid crystal display panels may be used. In addition, when a display device equipped with the display panel 103 is produced, the display device may be produced through a common assembly process.

Further, the display panel of the present Preferred embodiment is not specifically limited as long as it is a display panel with a display region being constituted by pixels arranged in a matrix. Accordingly, the display panel 103 of the present Preferred embodiment may be a passive matrix liquid crystal display panel.

As above, the present invention has been described in detail with reference to Preferred embodiments 1, 2, and 3. Here, it is to be noted that respective Preferred embodiments may be employed in combination as appropriate to the extent without departing from the scope of the invention. For example, in the display panel of the present invention, various arrangements of pixels mentioned in Preferred embodiments 1 to 3 may be employed in combination as appropriate in accordance with the contour shape of the display region.

From the standpoint of obtaining a display panel having a good appearance with the contour section of the display region drawing a curve close to a complete curve, the display panel of Preferred embodiment 3 is the most preferred one and the display panel of Preferred embodiment 1 is the next most preferred one. From the standpoint of facilitating the designing and production of the display, the display panel of Preferred embodiment 2 is the most preferred one and the display panel of Preferred embodiment 1 is the next most preferred one. From the standpoint of preventing coloring in the contour section of the display region, the display panel of Preferred embodiment 2 and the display panel of Preferred embodiment 3 are preferred.

In a case where an organic EL display is used in the display panel of the present invention, display elements constituted by an organic thin film comprising an electrode and an emissive material, and the like may be used in producing a display panel instead of display elements using liquid crystals.

Further, in a case where a PDP panel is used in the display panel of the present invention, display elements constituted by an electrode, a dielectric body, noble gas, a fluorescent material, and the like may be used in producing a display panel instead of display elements using liquid crystals.

The present application claims priority to Patent Application No. 2007-283938 filed in Japan on Oct. 31, 2007 under the Paris Convention and provisions of national law in a designated State, the entire contents of which are hereby incorporated by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A display panel comprising:
   a display region including:
      an array of a plurality of pixels each including a plurality of sub-pixels; and
      a plurality of wirings provided along boundaries of the plurality of sub-pixels;
      wherein the plurality of pixels include a pixel of a contour located in a contour section of the display region;
      the sub-pixels included in the pixel of a contour have aperture regions having similar aperture areas to one another and contour lines each running in parallel with a drawing direction of one of the wirings at least on a side of a frame region;
      the aperture area of the pixel of a contour is smaller than aperture area of a pixel located at an inner side of the contour section of the display region;
      the display panel includes a light-shielding member, the light-shielding member defining an aperture area of each of the sub-pixels included in the pixel of a contour;
      the display panel includes a substrate and a wiring layer of a scanning line or a data signal line provided on the substrate; and
      the light-shielding member is provided by the same wiring layer as the scanning line or the data signal line.

2. The display panel according to claim 1,
   wherein the sub-pixels included in the pixel of a contour have similar aperture shapes to one another.

3. The display panel according to claim 1,
wherein the sub-pixels included in the pixel of a contour have different aperture shapes from one another.

4. The display panel according to claim 1,
wherein the plurality of pixels include a plurality of the pixels of a contour located in a contour section of the display region;
the sub-pixels included in the plurality of pixels of a contour have aperture regions having similar aperture areas to one another in respective pixels of a contour and contour lines each running in parallel with a drawing direction of one of the wirings at least on a side of a frame region; and
aperture areas of the plurality of the pixels of a contour vary stepwise along the contour of the display region.

5. The display panel according to claim 1,
wherein the display panel includes a pixel electrode provided on the substrate, and
the pixel electrode defines the aperture area of each of the sub-pixels included in the pixel of a contour.

6. A display device comprising the display panel according to claim 1.

* * * * *